United States Patent [19]

Nozawa et al.

[11] Patent Number: 5,332,603
[45] Date of Patent: Jul. 26, 1994

[54] LIQUID CRYSTAL DISPLAY DEVICE

[75] Inventors: Fumie Nozawa; Masami Ubukata, both of Tokorozawa, Japan

[73] Assignee: Hoechst Aktiengesellschaft, Frankfurt am Main, Fed. Rep. of Germany

[21] Appl. No.: 38,003

[22] Filed: Mar. 29, 1993

[30] Foreign Application Priority Data

Mar. 31, 1992 [JP] Japan .................. 4-077512

[51] Int. Cl.$^5$ ........................... G02F 1/1337
[52] U.S. Cl. ........................... 428/1; 359/75
[58] Field of Search .......... 428/1; 359/75, 78, 77

[56] References Cited

FOREIGN PATENT DOCUMENTS 58-72924  5/1983  Japan .
2-190144  7/1990  Japan .
32-4334/91  6/1993  Japan .
WO92/01728  2/1992  PCT Int'l Appl. .

Primary Examiner—Alexander S. Thomas
Attorney, Agent, or Firm—Curtis, Morris & Safford

[57] ABSTRACT

A liquid crystal display device comprising an alignment film having a high capacity of orienting liquid crystal using a polyester which is stable for a long period of time even under a high humidity condition.

The liquid crystal display device is characterized by using a polyester having one of the following repeating unit | and the repeating unit || or both:

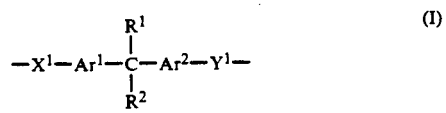

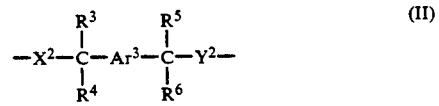

wherein $Ar^1$ to $Ar^3$ are substituted or unsubstituted aromatic rings, $R^1$ to $R^6$ are halogen-substituted alkyl groups, and $X^1$, $X^2$, $Y^1$ and $Y^2$ are —O— or

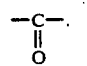

1 Claim, No Drawings

LIQUID CRYSTAL DISPLAY DEVICE

FIELD OF THE INVENTION

The present invention relates to a liquid crystal display device which is provided with alignment film(s) having a high capacity of orienting the liquid crystal and, more particularly, to a high-contrast and high-quality liquid crystal device having alignment film(s) prepared from an aromatic polyester.

BACKGROUND OF THE INVENTION

Polyimides or polyamides have been used for a liquid crystal alignment film capable of orienting liquid crystal molecules in one direction. A polyimide film is generally prepared by coating a polyamic acid solution on a substrate followed by ring-closure of the acid while heating to obtain the desired polyimide film thereon. However, in this case, there is a problem in that the film is often colored by heating whereby the colored film often adversely affects the appearance of the device prepared therefrom and also deteriorates the light-resistance of the film itself. In addition, heating at a temperature of at least 250° C. is necessary for conducting the ring closing reaction, and the heating at such a high temperature has a risk of causing deterioration of plastic substrates and color filters. Moreover, since polyimides generally have poor adhesion to a glass substrates, it is necessary to improve the adhesiveness thereof by using a silane coupling agent or a silane-containing diamine compound as described in JP-A-58-72924 (the term "JP-A" as used herein means an "unexamined published Japanese patent application"). However, the use of the silane coupling agent causes a problem in the stability of the solution, and the use of silane-containing diamine compound necessarily involves a problem of high cost since the monomer must be synthesized separately. Polyamides also show poor adhesion to the substrates and have the same problems as the polyimides.

Recently, an attempt has been made using a liquid crystal polymer as an alignment film as disclosed in, for example, JP-A-2-190144. When the liquid crystal polymer is used, the coated film need not be heated for effecting the ring-closing reaction and also deterioration of the substrate can be avoided without causing coloring of the coated film and adversely affecting the light-resistance. Further, the liquid crystal polymer shows good adhesiveness to the glass substrate, and thus additives such as silane coupling agent are not required. However, since conventional liquid crystal polymers have problems in that they have poor solubility and are therefore not easily coated on a substrate. Thus, practical uses of liquid crystal polymers are limited to particular polymers. In order to solve such problems, a liquid crystal polymer having a high solubility in the solvent which is generally used for spin-coating has been developed as disclosed in Japanese Patent Application No. Hei-3-324334. This liquid crystal polymer is very effective because of its excellent solubility and high capability of orienting the liquid crystal, but it precipitates a polymer under a high humidity condition and therefore must be stored under low humidity conditions such as in a nitrogen atmosphere. Accordingly, such liquid crystal polymers still require an improvement from a practical standpoint.

OBJECTS OF THE INVENTION

The object of the present invention is to overcome the above-described problems and to provide a liquid crystal display device comprising alignment film(s) having a high capacity of orienting the liquid crystal using a polyester which is stable for a long period of time even under high humidity conditions.

DETAILED DESCRIPTION OF THE INVENTION

The present inventors have found that polyesters of specific compositions have an excellent solubility in various ordinary solvents at room temperature, and the resulting solution of the polyesters exhibit an excellent storage stability under high humidity conditions, and yet the polyesters have a high capacity of orienting the liquid crystal.

That is, the present invention provides a liquid crystal display device having a liquid crystal layer between a pair of substrates each having a transparent electrode and an alignment film formed in this order on the inner surface thereof, characterized in that a polyester having one of the following repeating units | and || or both and, optionally, further containing at least one repeating unit which is capable of forming an ester bond with one or both of the repeating units | and || is used as a material for the alignment film provided on at least one inner surface of the facing substrates.

The repeating unit | is represented by the formula:

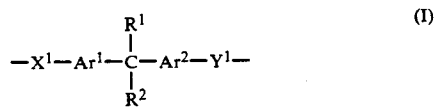

wherein $Ar^1$ and $Ar^2$ may be the same or different. Each $Ar^1$ and $Ar^2$ represents an aromatic ring which may have at least one substituent selected from the group consisting of an alkyl group having from 1 to 12 carbon atoms, an alkoxy group having from 1 to 12 carbon atoms, an amino group, a halogen atom, a phenyl group and a substituted phenyl group. $R^1$ and $R^2$, which may be the same or different, each represents an alkyl group having from 1 to 4 carbon atoms substituted with a halogen atom. Each $X^1$ and $Y^2$, may be the same or different and represents —O— or

Each polyester molecule may contain two or more of the same or different repeating unit |.

The repeating unit || is represented by the formula:

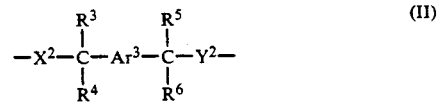

wherein $Ar^3$ represents an aromatic ring which may have at least one substituent selected from the group consisting of an alkyl group having from 1 to 12 carbon atoms, an alkoxy group having from 1 to 12 carbon atoms, an amino group, a halogen atom, a phenyl group and a substituted phenyl group. $Ar^3$ may be the same as or different from Ar¹ or Ar². R³, R⁴, R⁵, and R⁶, which may be the same or different respectively, each represents an alkyl group having from 1 to 4 carbon atoms substituted with a halogen atom and may be same as or different from R¹ or R². X² and Y₂, which may be the same or different, each represents —O— or

and may be the same or different from X¹ and Y¹. Each polyester molecule may contain two or more of the same or different repeating unit ||.

Examples of the repeating unit | of the polyester used in the liquid crystal display device of the present invention include 2,2-bis(4-hydroxyphenyl)hexafluoropropane, 2,2-bis(4-carboxyphenyl)hexafluoropropane, 2,2-bis(3-amino-4-hydroxyphenyl)hexafluoropropane and the like. Preferred repeating units include 2,2-bis(4-hydroxyphenyl)hexafluoropropane and 2,2-bis(4-carboxyphenyl)hexafluoropropane. In the polyester used in the present invention, two or more monomers may be contained as a repeating unit |.

Examples of the repeating unit || of the polyester used in the liquid crystal display device of the present invention include 1,3-bis(2-hydroxyhexafluoroisopropyl)benzene, 1,4-bis(2-hydroxyhexafluoroisopropyl)benzene and the like.

The polyester used in the present invention preferably contains other repeating units in addition to the above-described repeating unit | and repeating unit ||. The molar concentration of the repeating units | and || contained in the polyester is preferably from 0.1 to 70 mol %, more preferably from 1 to 50 mol %, though the molar concentration of the repeating units | and || varies depending on the kind of other repeating units to be contained in the polyester. In case that either the repeating unit | or the repeating unit || is used, this repeating unit is preferably used at a molar concentration in the above-described range.

The polyester used in the liquid crystal display device of the present invention shows a liquid crystal phase generally at a temperature below about 400° C. preferably below 350° C.

The terminal groups of the polyester used in the liquid crystal display device of the present invention generally have the following structure, though it may vary depending upon the selected synthetic method.

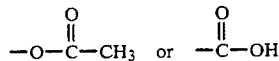

The terminal group can be optionally protected according to the procedure known in the art. For example, the acidic terminal groups can be protected with various alcohols; and the hydroxyl terminal groups may be protected with various organic acids. For example, a protective unit of the following phenyl ester:

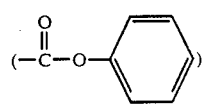

can be introduced into the polyester terminals. If desired, the polyester may be optionally heated in an oxygen-containing atmosphere (for example, air) at a temperature not higher than the melting point thereof for a predetermined period of time (for example, several minutes) so as to oxidatively crosslink the polyester. Such heating process may be performed either in the non-wrapped form or in the form of a previously shaped article. The above-described polyester used in the present invention can be produced according to the procedure as described in, for example, U.S. Pat. No. 3,637,595.

The polyester used in the liquid crystal display device of the present invention generally has a mean molecular weight of approximately from 2,000 to 2,000,000, preferably approximately from 5,000 to 1,000,000. The molecular weight is measured by a standard measurement method (for example, by a gel permeation chromatography method or a method for infrared-spectrographically detecting the terminal groups of the shaped polyester film).

The liquid crystal display device of the present invention can be prepared, for example, by dissolving the above-described polyester in an appropriate solvent, coating the resulting solution on a substrate by spin-coating or printing, then drying the coated film at 180° C. to remove the solvent therefrom, subjecting the dried film to a rubbing treatment, a shearing stress treatment or a temperature gradient heating treatment to obtain an alignment film, face-to-face arranging the two substrates each coated with the alignment film in parallel to each other, and finally introducing a liquid crystal into the space between the thus arranged two substrates, followed by sealing the substrates. However, the liquid crystal display device of the present invention is not whatsoever restricted by the process described above.

The liquid crystal display device of the present invention is characterized by the high contrast and high display quality. Although ordinary wholly aromatic ester polymers (i.e., a polymer in which each of the monomer units constituting the main chain of the polymer has at least one aromatic ring) are slightly soluble in organic solvents, the polyesters used in the liquid crystal display device of the present invention are easily soluble in ordinary organic solvents at room temperature and additionally the resulting polyester solutions are stable at high humidity for a long period of time. For this reason, a film having a desired thickness can easily be prepared by coating the polyester solution on a substrate by spin-coating or printing.

In addition, since the polyester used in the present invention has an excellent film-forming property, an even film having low surface roughness can be produced, and, by further subjecting the film to a rubbing treatment, a uniform alignment film can be obtained. For this reason, the liquid crystal display device having the alignment film of the polyester of the present invention has a high contrast ratio.

Moreover, since the polyester used in the present invention does not dissolve liquid crystal compounds, the liquid crystal display device of the present invention is excellently stable for a long period of time. The alignment film prepared from the polyester of the present invention maintains a stable and high capacity of orienting the liquid crystal even at a high temperature. This can be considered due to the high thermal stability of wholly aromatic crystalline polymers.

In addition, the alignment film prepared from the polyester of the present invention has an extremely excellent adhesiveness to a glass substrate. Therefore, even though no silane coupling agent is added thereto, the film has a substrate-adhering capacity comparable to that of polyimide film containing a silane coupling agent or a polyimide film containing a silane diamine compound. Since the alignment film of the present invention does not require any additive for increasing the adhesiveness, the cost of the liquid crystal display device of the present invention can be reduced. In addition, since the film of the polyester of the present invention can be formed not only on a glass substrate but also even on plastic substrates or sheets at a low temperature (about 120° C.), the present invention can be applied to various utilities.

Examples of solvents which are preferably used for dissolving the above-described polyesters include dimethyl sulfoxide, dimethylformamide, dimethylacetamide, N-methyl-2-pyrrolidone, butyrolacetone, cyclohexanone, cyclohexanol, pentafluorophenol, hexafluoroisopropanol, ethylene glycol monomethyl ether, ethylene glycol monopropyl ether and ethylene glycol monobutyl ether. These solvents can be used alone or as a mixture thereof.

EXAMPLES

The present invention is described in more detail by the following examples and comparative examples, but the present invention is not limited to these examples. For describing the examples, synthesis examples of the polymers used in the present invention are first described hereinafter.

SYNTHESIS EXAMPLE 1

69.1 g of hydroxybenzoic acid, 181.9 g of 2,2-bis(4-carboxyphenyl)hexafluoropropane, 51.4 g of hydroquinone and 0.023 g of potassium acetate were placed into a polymerization apparatus equipped with a strirrer, a nitrogen gas introducing duct and a condenser, and after the inside atmosphere of the polymerization apparatus was replaced by a nitrogen gas, 150.1 g of acetic anhydride was added thereto. Thereafter, the temperature of the mixture was elevated to 150° C. over a period of about 2 hours for effecting active esterification of the hydroxy groups of the reactants. Then, the reaction temperature was further elevated to 310° C. over a period of about 3.5 hours for effecting the polymerization while removing the by-product of acetic acid by distillation.

The pressure in the apparatus was reduced to 3 mmHg, and the polymerization was continued for additional about 40 minutes. The polymerization apparatus was cooled to room temperature in a nitrogen gas atmosphere, and the polymer formed was separated. The polymer thus obtained is hereinafter called as Polymer 1.

SYNTHESIS EXAMPLE 2

69.1 g of hydroxybenzoic acid, 77.1 g of isophthalic acid, 40.2 g of methylhydroquinone, 48.1 g of 2,2-bis(4-hydroxyphenyl)hexafluoropropane and 0.018 g of potassium acetate were placed into a polymerization apparatus equipped with a stirrer, a nitrogen gas introducing duct and a condenser, and, after the inside atmosphere of the polymerization apparatus was replaced by a nitrogen gas, 150.1 g of acetic anhydride was added thereto. Thereafter, the mixture was worked up in the same manner as in Example 1, and Polymer 2 was separated.

SYNTHESIS EXAMPLE 3

69.1 g of hydrobenzoic acid, 77.1 g of isophthalic acid, 17.8 g of methylhydroquinone, 19.9 g of hydroquinone, 48.1 g of 2,2-bis(4-hydroxyphenyl)hexafluoropropane and 0.017 g of potassium acetate were placed into a polymerization apparatus equipped with a stirrer, a nitrogen gas introducing duct and a condenser, and, after the inside atmosphere of the polymerization apparatus was replaced by a nitrogen gas, 150.1 g of acetic anhydride was added thereto. Thereafter, the mixture was worked up in the same manner as in Example 1, and Polymer 3 was separated.

SYNTHESIS EXAMPLE 4

49.3 g of hydroxybenzoic acid, 23.8 g of p-(hydroxyphenyl)propionic acid, 77.1 g of isophthalic acid, 52.3 g of 2,2-bis(3-amino-4-hydroxyphenyl)hexafluoropropane, 35.7 g of hydroquinone and 0.018 g of potassium acetate were placed into a polymerization apparatus equipped with a stirrer, a nitrogen gas introducing duct and a condenser, and, after the inside atmosphere of the polymerization apparatus was replaced by a nitrogen gas, 150.1 g of acetic anhydride was added thereto. Thereafter, the mixture was worked up in the same manner as in Example 1, and Polymer 4 was separated.

SYNTHESIS EXAMPLE 5

78.9 g of hydroxybenzoic acid, 112.1 g of 2,2-bis(4-carboxyphenyl)hexafluoropropane, 34.6 g of 4,4-biphenylcarboxylic acid, 47.5 g of hydroquinone and 0.020 g of potassium acetate were placed into a polymerization apparatus equipped with a stirrer, a nitrogen gas introducing duct and a condenser, and, after the inside atmosphere of the polymerization apparatus was replaced by a nitrogen gas, 150.1 g of acetic anhydride was added thereto. Thereafter, the mixture was worked up in the same manner as in Example 1, and Polymer 5 was separated.

SYNTHESIS EXAMPLE 6

69.1 g of hydroxybenzoic acid, 58.6 g of 1,4-bis(2-hydroxyhexafluoroisopropyl)benzene, 77.1 g of isophthalic acid, 35.7 g of hydroquinone and 0.018 g of potassium acetate were placed into a polymerization apparatus equipped with a stirrer, a nitrogen gas introducing duct and a condenser, and, after the inside atmosphere of the polymerization apparatus was replaced by a nitrogen gas, 150.1 g of acetic anhydride was added thereto. Thereafter, the mixture was worked up in the same manner as in Example 1, and Polymer 6 was separated.

SYNTHESIS EXAMPLE 7

78.9 g of hydroxybenzoic acid, 56.1 g of 2,2-bis(4-carboxyphenyl)hexafluoropropane, 29.1 g of 1,4-bis(2-hydroxyhexafluoroisopropyl)benzene, 47.5 g of isophthalic acid, 39.6 g of hydroquinone and 0.019 g of potassium acetate were placed into a polymerization apparatus equipped with a stirrer, a nitrogen gas introducing duct and a condenser, and, after the inside atmosphere of the polymerization apparatus was replaced by a nitrogen gas, 150.1 g of acetic anhydride was added thereto. Thereafter, the mixture was worked up in the same manner as in Example 1, and Polymer 7 was separated.

EXAMPLE 1

Polymer 1 obtained in Synthesis Example 1 was dissolved in a mixture of N-methyl-2-pyrrolidone and cyclohexanone (4:1 by weight) at room temperature to prepare a 4 wt. % solution. The viscosity of the solution was 8 cp (at 25° C.)

A portion of the resulting solution was separated and allowed to stand under the conditions of 25° C. and 70% relative humidity for testing the storage stability of the solution.

Also, a portion of the solution was separated, and a glass substrates having a transparent electrode was coated with it by spin-coating at 3,000 rpm for 30 seconds and then dried at 180° C. for one hour. The thickness of the resulting film was about 500 Å. The thickness of the film to be formed may be varied by changing the concentration of the polymer solution for coating and the rotation rate used in the spin-coating. The coated substrates were rubbed with a nylon cloth in one direction, and the thus rubbed two substrates were faced each other in such a manner that the rubbing direction of the two substrates is in perpendicular (90° C.) to each other. The substrates were sealed together with an epoxy resin while opening an inlet for introducing a liquid crystal into the space between them, and then heated at 150° C. for one hour. Thereafter, a nematic liquid crystal ZLI1565 (manufactured by Merck Co.) was introduced into the space between the thus sealed two substrates, and the inlet was sealed to form a liquid crystal cell. The liquid crystal cell was rotated in an angle of 0° and 45° under observation by a polarizing microscope, whereupon the light transmittance was measured to obtain a contrast ratio. The results obtained are shown in Table 1.

EXAMPLE 2

Polymer 2 obtained in Synthesis Example 2 was dissolved in a mixture of N-methyl-2-pyrrolidone and cyclohexanone (4:1 by weight) at room temperature to prepare a 4 wt. % solution. The viscosity of the solution was 10 cp (at 25° C.).

In the same manner as described in Example 1, the storage stability of the solution and the contrast ratio were evaluated, and the results shown in Table 1 were obtained.

EXAMPLE 3

Polymer 3 obtained in Synthesis Example 3 was dissolved in a mixture of N-methyl-2-pyrrolidone and cyclohexanone (4:1 by weight) at room temperature to prepare a 4 wt. % solution. The viscosity of the solution was 11 cp (at 25° C.).

In the same manner as described in Example 1, the storage stability of the solution and the contrast ratio were evaluated, and the results shown in Table 1 were obtained.

EXAMPLE 4

Polymer 4 obtained in Synthesis Example 4 was dissolved in N-methyl-2-pyrrolidone at room temperature to prepare a 4 wt. % solution. The viscosity of the solution was 10 cp (at 25° C.).

In the same manner as described in Example 1, the storage stability of the solution and the contrast ratio were evaluated, and the results shown in Table 1 were obtained.

EXAMPLE 5

Polymer 5 obtained in Synthesis Example 5 was dissolved in γ-butyrolactone at room temperature to prepare a 4 wt. % solution. The viscosity of the solution was 10 cp (at 25° C.).

In the same manner as described in Example 1, the storage stability of the solution and the contrast ratio were evaluated, and the results shown in Table 1 were obtained.

EXAMPLE 6

Polymer 6 obtained in Synthesis Example 6 was dissolved in N-methyl-2-pyrrolidone at room temperature to prepare a 4 wt. % solution. The viscosity of the solution was 8 cp (at 25° C.).

In the same manner as described in Example 1, the storage stability of the solution and the contrast ratio were evaluated, and the results shown in Table 1 were obtained.

EXAMPLE 7

Polymer 7 obtained in Synthesis Example 7 was dissolved in N-methyl-2-pyrrolidone at room temperature to prepare a 4 wt. % solution. The viscosity of the solution was 11 cp (at 25° C.).

In the same manner as described in Example 1, the storage stability of the solution and the contrast ratio were evaluated, and the results shown in Table 1 were obtained.

COMPARATIVE EXAMPLE 1

27.8 g of n-hexylresorcin, 35.7 g of hydroquinone, 77.1 g of isophthalic acid, 69.1 g of hydroxygenzoic acid and 0.016 g of potassium acetate were placed into a polymerization apparatus equipped with a stirrer, a nitrogen gas introducing duct and a condenser, and, after the inside atmosphere of the polymerization apparatus was replaced by a nitrogen gas, 150.1 g of acetic anhydride was added thereto. Thereafter, the mixture was worked up in the same manner as in Example 1, and Comparative Polymer 1 was obtained.

The above polymer was evaluated for the storage stability of the solution and the contrast ratio in the same manner as described in Example 1, and the results shown in Table 1 were obtained.

COMPARATIVE EXAMPLE 2

35.7 g of hydroquinone, 77.1 g of isophthalic acid, 26.1 g of 2'-hydroxyethyl hydroxybenzoate, 69.1 g of hydroxybenzoic acid and 0.015 g of potassium acetate were placed into a polymerization apparatus equipped with a stirrer, a nitrogen gas introducing duct and a condenser, and, after the inside atmosphere of the polymerization apparatus was replaced by a nitrogen gas, 150.1 g of acetic anhydride was added thereto. Thereafter, the mixture was worked up in the same manner as described in Example 1, and Comparative Polymer 2 was obtained.

The above polymer was evaluated for the storage stability of the solution and the contrast ratio in the same manner as described in Example 1, and the results shown in Table 1 were obtained.

COMPARATIVE EXAMPLE 3

35.6 g of p-(hydroxyphenyl)propionic acid, 49.3 g of hydroxybenzoic acid, 59.6 g of 2,3-dimethylhydroquinone, 71.3 g of isophthalic acid and 0.016 g of potassium acetate were placed into a polymerization apparatus equipped with a stirrer, a nitrogen gas introducing duct and a condenser, and, after the inside atmosphere of the polymerization apparatus was replaced by a nitrogen gas, 150.1 g of acetic anhydride was added thereto. Thereafter, the mixture was worked up in the same manner as described in Example 1, and Comparative Polymer 3 was obtained.

The above polymer was evaluated for the storage stability of the solution and the contrast ratio in the same manner as described in Example 1, and the results shown in Table were obtained.

|  | Polymer | Store Stability of Solution (70%, 25° C.) | Contrast Ratio |
| --- | --- | --- | --- |
| Example 1 | Polymer 1 | Stable for 1 month or more | 33 |
| Example 2 | Polymer 2 | Stable for 1 month or more | 38 |
| Example 3 | Polymer 3 | Stable for a month or more | 50 |
| Example 4 | Polymer 4 | Stable for 1 month or more | 43 |
| Example 5 | Polymer 5 | Stable for 1 month or more | 45 |
| Example 6 | Polymer 6 | Stable for 1 month or more | 40 |
| Example 7 | Polymer 7 | Stable for 1 month or more | 36 |
| Comparative Example 1 | Comparative Polymer 1 | Turbid after one day | 30 |
| Comparative Example 2 | Comparative Polymer 2 | Turbid after one day | 35 |
| Comparative Example 3 | Comparative Polymer 3 | Turbid after 3 days | 43 |

What is claimed is:

1. A liquid crystal display device having a liquid crystal layer between a pair of substrates each having a transparent electrode and an alignment film formed in this order on the inner surface thereof, characterized in that a polyester having one or both of the following repeating units I and II and, optionally, further containing at least one repeating unit which is capable of forming an ester bond with one of said repeating units I and II or both for use as a material for the alignment film provided on at least one inner surface of the facing substrates; the repeating unit I being represented by the formula:

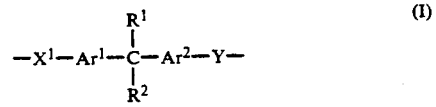

wherein $Ar^1$ and $Ar^2$, which may be the same as or different from one another, each represents an aromatic ring which may have at least one substituent selected from the group consisting of an alkyl group having from 1 to 12 carbon atoms, an alkoxy group having from 1 to 12 carbon atoms, an amino group, a halogen atom, a phenyl group and a substituted phenyl group; $R^1$ and $R^2$, which may be the same as or different from one another, each represents an alkyl group having from 1 to 4 carbon atoms substituted with halogen atom; $X^1$ and $Y^2$, which may be the same as or different from one another, each represents —O— or

and one polyester molecule may contain two or more same or different repeating unit I; the repeating unit II being represented by the formula:

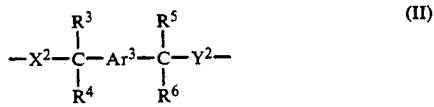

where $Ar^3$ represents an aromatic ring which may have at least one substituent selected from the group consisting of an alkyl group having from 1 to 12 carbon atoms, an alkoxy group having from 1 to 12 carbon atoms, an amino group, a halogen atom, a phenyl group and a substituted phenyl group and may be the same as or different from $Ar^1$ or $Ar^2$; $R^3$, $R^4$, $R^5$ and $R^6$, which may be the same or different respectively, each represents an alkyl group having from 1 to 4 carbon atoms substituted with halogen atom and may be the same as or different from $R^1$ or $R^2$; $X^2$ and $Y^2$, which may be the same as or different from one another, each represents —O— or

and may be the same as or different from $X^1$ and $Y^1$, and the one polyester molecule may contain two or more of the same or different repeating unit II.

* * * * *